(12) United States Patent
Tsuchida et al.

(10) Patent No.: US 11,434,547 B2
(45) Date of Patent: Sep. 6, 2022

(54) METAL POROUS MATERIAL, FUEL CELL, AND METHOD OF PRODUCING METAL POROUS MATERIAL

(71) Applicant: SUMITOMO ELECTRIC TOYAMA CO., LTD., Imizu (JP)

(72) Inventors: Hitoshi Tsuchida, Imizu (JP); Junichi Nishimura, Imizu (JP); Seiji Mabuchi, Imizu (JP)

(73) Assignee: SUMITOMO ELECTRIC TOYAMA CO., LTD., Imizu (JP)

( * ) Notice: Subject to any disclaimer, the term of this patent is extended or adjusted under 35 U.S.C. 154(b) by 272 days.

(21) Appl. No.: 16/637,797

(22) PCT Filed: Jul. 3, 2019

(86) PCT No.: PCT/JP2019/026487
§ 371 (c)(1),
(2) Date: Feb. 10, 2020

(87) PCT Pub. No.: WO2020/049851
PCT Pub. Date: Mar. 12, 2020

(65) Prior Publication Data
US 2021/0062300 A1    Mar. 4, 2021

(30) Foreign Application Priority Data
Sep. 7, 2018  (JP) .............................. JP2018-168102

(51) Int. Cl.
*C22C 1/08*  (2006.01)
*C22C 19/05*  (2006.01)
*C23C 10/40*  (2006.01)
*H01M 4/88*  (2006.01)
*H01M 8/0232*  (2016.01)

(52) U.S. Cl.
CPC ................ *C22C 1/08* (2013.01); *C22C 19/05* (2013.01); *C23C 10/40* (2013.01); *H01M 4/8807* (2013.01); *H01M 8/0232* (2013.01)

(58) Field of Classification Search
None
See application file for complete search history.

(56) References Cited

U.S. PATENT DOCUMENTS

| 5,582,867 A | 12/1996 | Tsubouchi et al. |
| 2005/0112353 A1 | 5/2005 | Harada et al. |

(Continued)

FOREIGN PATENT DOCUMENTS

| CN | 1531126 A | 9/2004 |
| JP | H05-109431 A | 4/1993 |

(Continued)

*Primary Examiner* — Xiaobei Wang
(74) *Attorney, Agent, or Firm* — Oliff PLC

(57) ABSTRACT

A metal porous material according to an aspect of the present disclosure is a metal porous material in sheet form that includes a frame having a three-dimensional network configuration, wherein the frame includes an alloy including at least nickel (Ni) and chromium (Cr), the frame 11 is a solid solution with iron (Fe), the frame includes a chromium oxide ($Cr_2O_3$) layer as an outermost layer and includes a chromium carbide layer located under the chromium oxide layer, the chromium oxide layer has a thickness not less than 0.1 μm and not more than 3 μm, and the chromium carbide layer has a thickness not less than 0.1 μm and not more than 1 μm.

4 Claims, 6 Drawing Sheets

(56) References Cited

U.S. PATENT DOCUMENTS

| | | |
|---|---|---|
| 2013/0295459 A1 | 11/2013 | Nishimura et al. |
| 2014/0335441 A1 | 11/2014 | Tsukamoto et al. |
| 2018/0219232 A1 | 8/2018 | Okuno et al. |

FOREIGN PATENT DOCUMENTS

| | | |
|---|---|---|
| JP | H08-013129 A | 1/1996 |
| JP | 2003-282137 A | 10/2003 |
| JP | 2008-137819 A | 6/2008 |
| JP | 2011-149049 A | 8/2011 |
| JP | 2012-149282 A | 8/2012 |
| JP | 2017-033917 A | 2/2017 |

METAL POROUS MATERIAL, FUEL CELL, AND METHOD OF PRODUCING METAL POROUS MATERIAL

TECHNICAL FIELD

The present disclosure relates to a metal porous material, a fuel cell, and a method of producing a metal porous material. The present application claims priority to Japanese Patent Application No. 2018-168102 filed on Sep. 7, 2018, the disclosure of which is hereby incorporated by reference in its entirety.

BACKGROUND ART

A conventionally known method of producing a metal porous material having a high porosity and a large surface area involves forming a metal layer on a surface of a resin porous material such as a resin foam. For instance, a metal porous material may be produced by performing electrically conductive treatment on a resin molded article including a frame having a three-dimensional network configuration to make a surface of the frame electrically conductive, then carrying out electroplating to form a metal layer on the frame, and then, if necessary, burning off the resin molded article.

Metal porous materials have various applications, and some of the applications require a high corrosion resistance of the frame. Examples of a known metal porous material with a high corrosion resistance include a metal porous material including a nickel-chromium alloy frame.

Japanese Patent Laying-Open No. 2012-149282 (PTL 1) teaches a method of producing a metal porous material including alloy of nickel and chromium, where the method involves preparing a metal porous material including a nickel frame (hereinafter also called "nickel porous material"), then performing plating to form a chromium layer on a surface of the frame, and subsequently performing heat treatment to diffuse chromium.

Japanese Patent Laying-Open No. 08-013129 (PTL 2) teaches a method of producing a metal porous material including alloy of nickel and chromium by burying a nickel porous material in powder that includes Al, Cr, and $NH_4Cl$ or a compound of these and then performing heat treatment in an atmosphere filled with Ar gas, $H_2$ gas, and/or the like to cause diffusion coating.

CITATION LIST

Patent Literature

PTL 1: Japanese Patent Laying-Open No. 2012-149282
PTL 2: Japanese Patent Laying-Open No. 08-013129

SUMMARY OF INVENTION

A metal porous material according to an aspect of the present disclosure is
a metal porous material in sheet form that includes a frame having a three-dimensional network configuration, wherein
the frame includes an alloy including at least nickel (Ni) and chromium (Cr), the frame 11 is a solid solution with iron (Fe),
the frame includes a chromium oxide ($Cr_2O_3$) layer as an outermost layer and includes a chromium carbide layer located under the chromium oxide layer,
the chromium oxide layer has a thickness not less than 0.1 μm and not more than 3 μm, and
the chromium carbide layer has a thickness not less than 0.1 μm and not more than 1 μm.

A method of producing a metal porous material according to an aspect of the present disclosure includes:
preparing a porous material that includes a frame having a three-dimensional network configuration and containing nickel as a primary component, the preparing including:
  performing electrically conductive treatment on a surface of a frame of a resin molded article including a frame having a three-dimensional network configuration by applying carbon powder to the surface of the frame of the resin molded article;
  performing nickel plating to plate with nickel the surface of the frame of the resin molded article thus made electrically conductive;
  subsequently removing the resin molded article by heat treatment in an oxidizing atmosphere; and
  after the removing the resin molded article, performing heat treatment in a reducing atmosphere containing water vapor to lower an amount of carbon remaining in the nickel; and
forming alloy of at least nickel and chromium to obtain a metal porous material, the forming involving burying the porous material in powder including chromium (Cr), aluminum oxide ($Al_2O_3$), and ammonium chloride ($NH_4Cl$) and then performing heat treatment to cause diffusion coating of the frame with the chromium.

DETAILED DESCRIPTION

Figure 1:
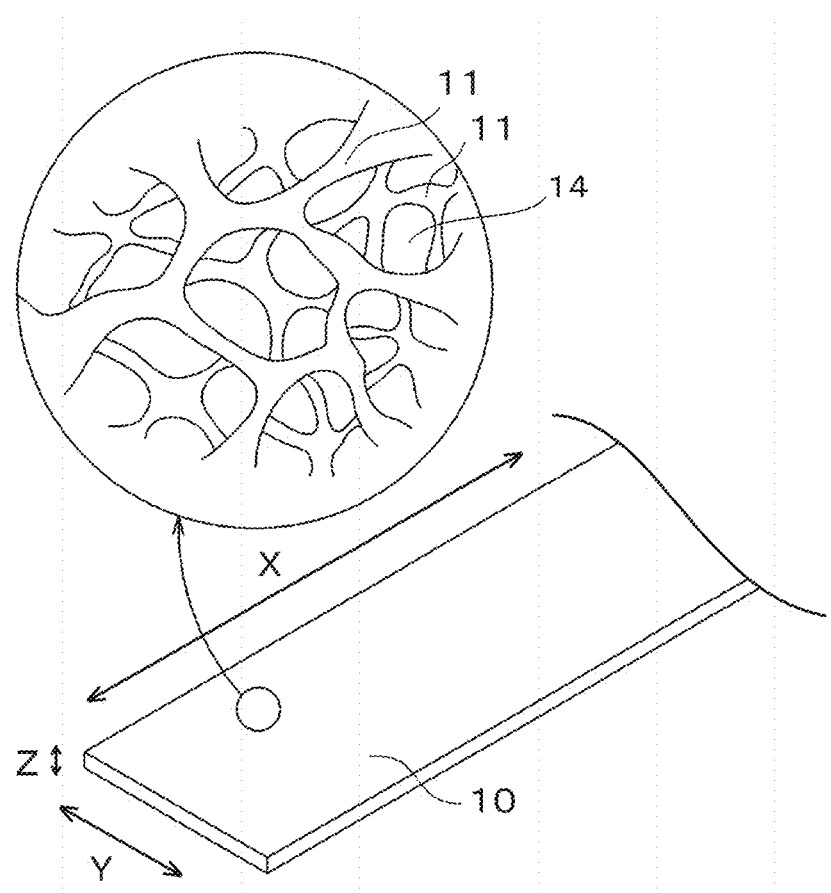
FIG. 1 is a schematic view of an example metal porous material according to an embodiment of the present disclosure.

Problem to be Solved by the Present Disclosure

In recent years, further enhancement in power and capacity (size reduction) has been demanded of various batteries such as fuel cells as well as power storage devices such as capacitors.

As a gas diffusion layer of a fuel cell, a carbon structure and/or a stainless steel (SUS) structure is typically used. Each of the carbon structure and the SUS structure has grooves that serve as gas channels. Each groove has a continuous linear shape with a width of about 500 μm. The grooves occupy about half the area of the boundary between the carbon structure or the SUS structure and an electrolyte, and therefore the gas diffusion layer has a porosity of about 50%. Including such a gas diffusion layer having a not very high porosity and a great pressure loss, conventional fuel cells cannot have a reduced size and an enhanced power at the same time.

To address this problem, the inventors of the present invention researched replacing the carbon structure or the SUS structure, serving as a gas diffusion layer of a fuel cell, by a metal porous material that includes a frame having a three-dimensional network configuration. Including a metal porous material having a high porosity as a gas diffusion layer, a fuel cell may have an enhanced gas diffusing performance and an increased gas use efficiency. In a polymer electrolyte fuel cell (PEFC), for example, including a metal porous material as a gas diffusion layer, the metal porous material is exposed to strong acid generated from a membrane electrode assembly (MEA) and therefore needs to have a high corrosion resistance.

A metal porous material that includes a nickel-chromium alloy frame has a high corrosion resistance and is therefore usable as a gas diffusion layer of a fuel cell.

In production of a metal porous material by plating, like in the method taught by PTL 1, it is necessary to use a trivalent chromium plating solution from the environmental viewpoint. When a trivalent chromium plating solution is used, however, the film forming rate is as low as about 0.3 µm/h and thereby it takes long to produce a metal porous material with a chromium alloy ratio equal to or higher than 20%. Therefore, there is room for improvement in terms of productivity.

To address this problem, the inventors of the present invention researched using, as a gas diffusion layer of a fuel cell, a metal porous material produced by diffusion coating like in the method taught by PTL 2. The research found room for improvement; when the metal porous material is used as a gas diffusion layer, water ($H_2O$) occurring as a result of power generation needs to be quickly discharged from a pore portion.

The present disclosure has been devised in light of the above-described circumstances, and an object of the present invention is to provide a metal porous material that has an excellent corrosion resistance and includes a frame having a highly water-repellent surface.

Advantageous Effect of the Present Disclosure

The present disclosure is capable of providing a metal porous material that has an excellent corrosion resistance and includes a frame having a highly water-repellent surface.

DESCRIPTION OF EMBODIMENTS

First, a description will be given of each aspect of the present disclosure.

(1) A metal porous material according to an aspect of the present disclosure is a metal porous material in sheet form that includes a frame having a three-dimensional network configuration, wherein the frame includes an alloy including at least nickel (Ni) and chromium (Cr), the frame 11 is a solid solution with iron (Fe), the frame includes a chromium oxide ($Cr_2O_3$) layer as an outermost layer and includes a chromium carbide layer located under the chromium oxide layer, the chromium oxide layer has a thickness not less than 0.1 µm and not more than 3 µm, and the chromium carbide layer has a thickness not less than 0.1 µm and not more than 1 µm.

According to the aspect of (1) above, a metal porous material that has an excellent corrosion resistance and has fewer microparticles adhered to a surface of a frame thereof is provided at low cost.

(2) Preferably, the metal porous material according to (1) above has a porosity not less than 60% and not more than 98%.

According to the disclosure of (2) above, a metal porous material having a very high porosity is provided.

(3) Preferably, the metal porous material according to (1) or (2) above has an average pore size not less than 50 µm and not more than 5000 µm.

According to the disclosure of (3) above, a metal porous material that, when used as a gas diffusion layer of a fuel cell, exhibits an enhanced gas diffusing performance and efficiently discharges water occurring as a result of power generation is provided.

(4) A fuel cell according to an aspect of the present disclosure is a fuel cell including the metal porous material according to any one of (1) to (3) above as a gas diffusion layer.

According to the disclosure of (4) above, a compact and powerful fuel cell is provided.

(5) A method of producing a metal porous material according to an aspect of the present disclosure includes:

preparing a porous material that includes a frame having a three-dimensional network configuration and containing nickel as a primary component, the preparing including:

performing electrically conductive treatment on a surface of a frame of a resin molded article including a frame having a three-dimensional network configuration by applying carbon powder to the surface of the frame of the resin molded article;

performing nickel plating to plate with nickel the surface of the frame of the resin molded article thus made electrically conductive;

subsequently removing the resin molded article by heat treatment in an oxidizing atmosphere; and after the removing the resin molded article, performing heat treatment in a reducing atmosphere containing water vapor to lower an amount of carbon remaining in the nickel; and forming alloy of at least nickel and chromium to obtain a metal porous material, the forming involving burying the porous material in powder including at least chromium (Cr), aluminum oxide ($Al_2O_3$), and ammonium chloride ($NH_4Cl$) and then performing heat treatment to cause diffusion coating of the frame with the chromium.

According to the aspect of (5) above, a method of producing a metal porous material capable of providing a metal porous material that has an excellent corrosion resistance and includes a frame having a highly water-repellent surface is provided.

Detailed Description of Aspects

In the following, a more detailed description will be given of specific examples of a metal porous material, a fuel cell, and a method of producing a metal porous material each according to an aspect of the present disclosure. It is intended that the scope of the present invention is defined by claims, not by the examples given below, and encompasses all modifications and variations equivalent in meaning and scope to the claims.

<Metal Porous Material>

FIG. 1 is a schematic view of an example metal porous material according to an embodiment of the present disclosure. As shown in FIG. 1, a metal porous material 10 according to an embodiment of the present disclosure includes a frame 11 having a three-dimensional network configuration and has a sheet-form outer shape. Frame 11 defines a pore portion 14, which is a continuous pore that connects a surface of metal porous material 10 to inside the metal porous material 10.

Figure 2:
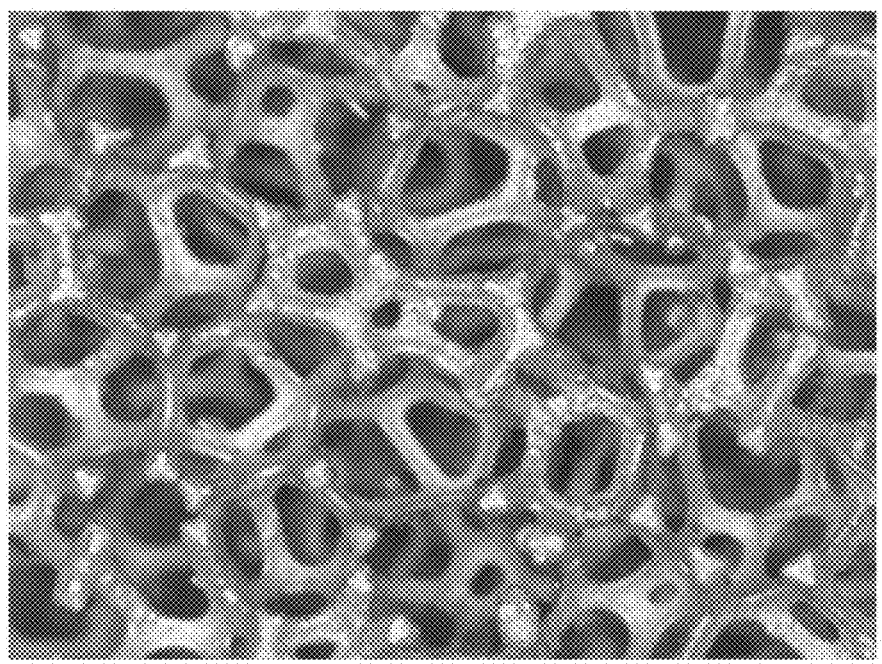
FIG. 2 is a sectional photograph of an example metal porous material according to an embodiment of the present disclosure.
Figure 3:
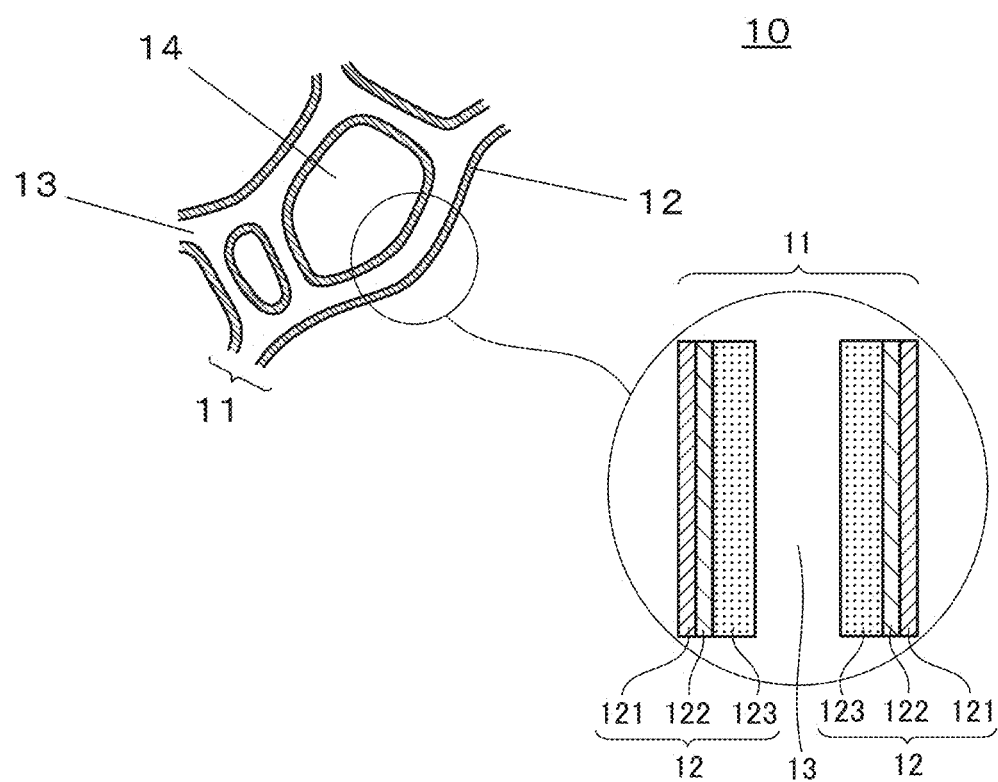
FIG. 3 is an expanded view schematically illustrating a partial cross section of an example metal porous material according to an embodiment of the present disclosure.

FIG. 2 is a sectional photograph of frame 11, which has a three-dimensional network configuration, of metal porous material 10 according to an embodiment of the present disclosure. FIG. 3 is an expanded view schematically illustrating a cross section of metal porous material 10 shown in FIG. 2. When the shape of frame 11 has a three-dimensional network configuration, frame 11 of metal porous material 10 has a hollow interior portion 13, which typically looks as shown in FIG. 3. Frame 11 is made of an alloy film 12.

Frame 11 may include an alloy including at least nickel (Ni) and chromium (Cr) and may be a solid solution with iron (Fe). Nickel is a primary component of frame 11, which means that nickel is contained in frame 11 in the highest ratio of all other components. Chromium in frame 11 may be present as $Cr_2Ni_3$, which is an alloy thereof with nickel, or may be present as chromium oxide ($Cr_2O_3$), or, needless to say, may be present as an alloy with other metal components. Iron may be present as a solid solution with an alloy component of frame 11 or a metal component of frame 11.

Preferably, the chromium content of frame 11 is not less than about 5 mass % and not more than about 45 mass %. When the chromium content of frame 11 is equal to or higher than 5 mass %, a metal porous material that has an excellent corrosion resistance and that does not allow nickel elution in a highly acidic atmosphere may be provided. When the chromium content of frame 11 is equal to or lower than 45 mass %, a metal porous material with an excellent tensile strength may be provided with less production costs. From these viewpoints, the chromium content of frame 11 is preferably not less than about 10 mass % and not more than about 45 mass %, more preferably not less than about 20 mass % and not more than about 40 mass %.

The iron content of frame 11 is preferably not less than about 50 ppm and not more than about 5000 ppm, more preferably not less than about 100 ppm and not more than about 3000 ppm, further preferably not less than about 200 ppm and not more than about 2000 ppm. When the iron content of frame 11 is equal to or higher than 50 ppm, spinel-type multiple oxide $FeCr_2O_4$ may be formed under an FeO layer and thereby may mitigate detachment of the chromium oxide mentioned above from a surface of frame 11. When the iron content of frame 11 is equal to or lower than 5000 ppm, an increase in electrical resistance of the metal porous material may be mitigated.

Frame 11 may contain components other than nickel, chromium, or iron, whether intentionally or inevitably. Examples of these other components include manganese (Mn), silicon (Si), aluminum (Al), and zirconium (Zr). Especially when frame 11 contains silicon as $SiO_2$, which has an effect of mitigating detachment of the chromium oxide from a surface of frame 11, the metal porous material has an excellent water repellency.

An outermost layer of frame 11 is a chromium oxide layer 121, which is a layer containing chromium oxide ($Cr_2O_3$). Under chromium oxide layer 121, a chromium carbide layer 122 is formed, which is a layer containing chromium carbide. When the outermost layer of frame 11 is chromium oxide layer 121, the metal porous material has an excellent water repellency. When frame 11 includes chromium carbide layer 122, the metal porous material has an excellent hardness.

Chromium oxide layer 121 as the outermost layer of frame 11 has a thickness not less than 0.1 μm and not more than 3 μm. When the thickness of chromium oxide layer 121 is equal to or greater than 0.1 μm, the metal porous material may have an enhanced water repellency. With a high water repellency of a surface of frame 11 of the metal porous material when used, for example, as a gas diffusion layer of a fuel cell, water occurring as a result of power generation may be discharged with a high efficiency. The water repellency effect attributed to chromium oxide layer 121 saturates when the thickness of chromium oxide layer 121 is about 3 μm and, therefore, the thickness of chromium oxide layer 121 may be equal to or smaller than 3 μm. With the thickness of chromium oxide layer 121 being equal to or smaller than about 3 μm, an increase in the production costs of the metal porous material may be mitigated.

Within frame 11, chromium carbide layer 122 is formed under chromium oxide layer 121 which serves as the outermost layer (in other words, chromium carbide layer 122 is formed on a side of chromium oxide layer 121 that is closer to the interior of the frame), and chromium carbide layer 122 has a thickness not less than 0.1 μm and not more than 1 μm. Chromium carbide has a high hardness, and therefore when the thickness of chromium carbide layer 122 in frame 11 is equal to or greater than 0.1 μm, the hardness of frame 11 is high. When the thickness of chromium carbide layer 122 is equal to or smaller than 1 μm, it is possible to increase the thickness of chromium oxide layer 121 without making frame 11 brittle. From these viewpoints, the thickness of chromium carbide layer 122 is more preferably not less than 0.1 μm and not more than 0.5 μm, more preferably not less than 0.1 μm and not more than 0.3 μm.

The chromium carbide in chromium carbide layer 122 may be present in two states: $Cr_7C_3$ and $Cr_{23}C_6$. In chromium oxide layer 121, the chromium carbide may be present on a grain boundary of chromium oxide crystals.

The presence of chromium oxide layer 121 and chromium carbide layer 122 in frame 11 may be checked by analyzing the frame of the metal porous material by energy dispersive X-ray spectrometry (EDX), X-ray fluorescence (XRF), and/or X-ray diffraction (XRD).

The porosity of metal porous material 10 according to an embodiment of the present disclosure may be selected as appropriate in accordance with the applications of the metal porous material. The porosity of metal porous material 10 is calculated by the following equation.

$$\text{Porosity (\%)} = [1 - \{Mp/(Vp \times dp)\}] \times 100$$

Mp: Mass of metal porous material [g]
Vp: Volume of metal porous material based on outer shape [$cm^3$]
dp: Density of metal of metal porous material [$g/cm^3$]

When metal porous material 10 is used as a gas diffusion layer of a fuel cell, for instance, it is preferable that the gas diffusing performance be excellent and the pressure loss be small. In that case, the porosity is preferably not less than 60% and not more than 98%, more preferably not less than 70% and not more than 98%, further preferably not less than 90% and not more than 98%.

The average pore size of metal porous material 10 according to an embodiment of the present disclosure may be selected as appropriate in accordance with the applications of the metal porous material. The average pore size of metal porous material 10 refers to a value obtained in the following manner: a surface of metal porous material 10 is examined with a microscope or the like in at least ten fields of view; the average number (nc) of pore portions 14 per one inch (25.4 mm=25400 μm) is counted; and calculation is carried out by the following equation.

Average pore size (μm)=25400 μm/nc

When metal porous material 10 is used as a gas diffusion layer of a fuel cell, for instance, the average pore size of metal porous material 10 may be selected in consideration of the diffusivity of the gas passing through pore portion 14 and the pressure loss. More specifically, the average pore size of the metal porous material when used as a gas diffusion layer of a fuel cell is preferably not less than 50 μm and not more than 5000 μm, more preferably not less than 100 μm and not more than 1000 μm, further preferably not less than 200 μm and not more than 700 μm.

The thickness of metal porous material 10 according to an embodiment of the present disclosure is not particularly limited and may be selected as appropriate in accordance with the applications of the metal porous material. The thickness of metal porous material 10 may be measured with a digital thickness gauge, for example.

In many cases, when the thickness of the metal porous material is not less than 0.1 mm and not more than 3.0 mm, the metal porous material may be lightweight and highly strong. From these viewpoints, the thickness of metal porous material 10 is more preferably not less than 0.3 mm and not more than 2.5 mm, further preferably not less than 0.4 mm and not more than 2.0 mm.

<Fuel Cell>

A fuel cell according to an embodiment of the present disclosure may have a configuration the same as that of a conventional fuel cell provided that it includes, as a gas diffusion layer, the metal porous material according to an embodiment of the present disclosure described above. The fuel cell is not particularly limited in type and may be a polymer electrolyte fuel cell or a solid oxide fuel cell. Being conductive, metal porous material 10 may serve dual duty as a gas diffusion layer and a current collector in the fuel cell.

The fuel cell according to an embodiment of the present disclosure includes a gas diffusion layer with a high gas diffusivity and thereby has an enhanced gas use efficiency. Therefore, size reduction and power enhancement of the fuel cell are achievable at the same time. Moreover, in the fuel cell according to an embodiment of the present disclosure, the metal porous material used as a gas diffusion layer includes frame 11 with an excellent water repellency and, thereby, water occurring as a result of power generation may be quickly discharged from pore portion 14.

In the following, a more specific description will be given of an example fuel cell according to an embodiment of the present disclosure referring to FIGS. 5 and 6.

Figure 5:
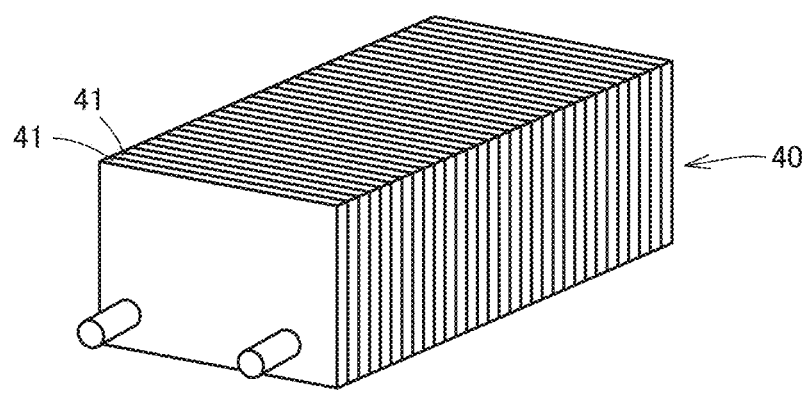
FIG. 5 is a scheme view of a fuel cell according to an embodiment of the present disclosure.

Referring to FIG. 5, a fuel cell 40 including metal porous material 10 according to the present embodiment has a stacked configuration composed of a plurality of single cells 41 and is, for example, a polymer electrolyte fuel cell. Single cell 41 includes, as shown in FIG. 6, an ion-exchange membrane 42, catalyst layers 43a, 43b, gas diffusion layers 44a, 44b, and separators 45. For instance, ion-exchange membrane 42 is a polymer electrolyte membrane containing an aqueous electrolyte solution. On a first principal surface of ion-exchange membrane 42, catalyst layer 43a is disposed. On a side of catalyst layer 43a opposite the side with ion-exchange membrane 42, gas diffusion layer 44a is disposed. On a second principal surface of ion-exchange membrane 42 opposite the first principal surface, catalyst layer 43b is disposed. On a side of catalyst layer 43b opposite the side with ion-exchange membrane 42, gas diffusion layer 44b is disposed. The combination of catalyst layer 43a and gas diffusion layer 44a makes a hydrogen electrode 46, and the combination of catalyst layer 43b and gas diffusion layer 44b makes an oxygen electrode 47. A structure composed of gas diffusion layer 44a, catalyst layer 43a, ion-exchange membrane 42, catalyst layer 43b, and gas diffusion layer 44b that are stacked and restrained together is called a membrane electrode assembly (MEA). This MEA is sandwiched between two separators 45.

Gas diffusion layers 44a, 44b serve dual duty as a platform for battery reaction and as a current collector. Therefore, they are required to have a moderate porosity and a moderate mechanical strength. It is therefore preferable to use metal porous material 10 according to the present embodiment.

Figure 6:
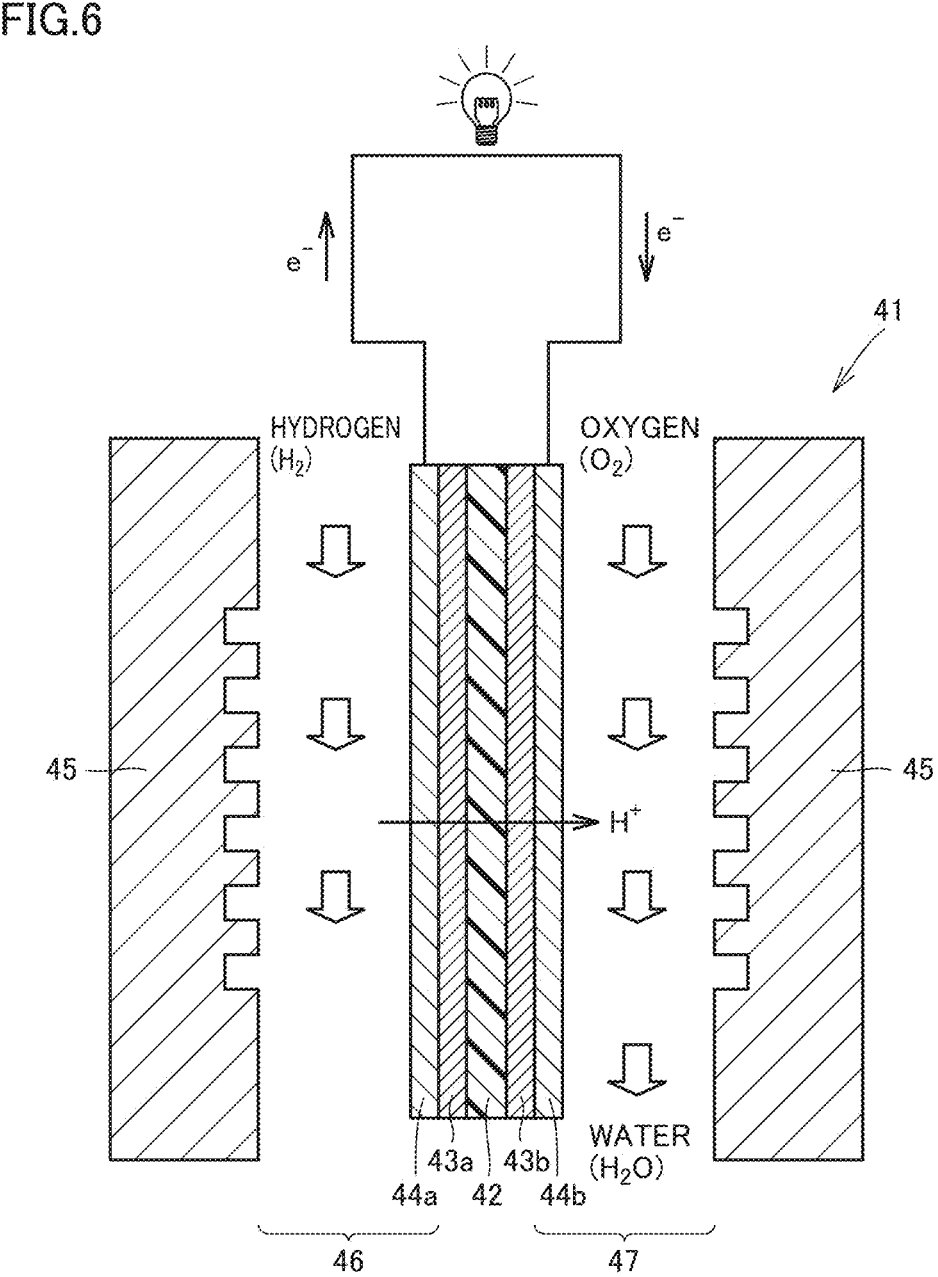
FIG. 6 is a sectional scheme view illustrating the configuration of a single cell shown in FIG. 5.

Referring to FIG. 6, when hydrogen gas is introduced into hydrogen electrode 46 and oxygen gas is introduced into oxygen electrode 47 in single cell 41, reaction "$H_2 \rightarrow 2H^+ + 2e^-$" occurs on hydrogen electrode 46 and reaction "$\frac{1}{2}O_2 + 2H^+ + 2e^- \rightarrow H_2O$" occurs on oxygen electrode 47. A proton ($H^+$) occurs on hydrogen electrode 46 and diffuses through ion-exchange membrane 42 as shown in FIG. 6 to move to the oxygen electrode 47 side. On oxygen electrode 47, the proton reacts with oxygen to generate water ($H_2O$).

<Method of Producing Metal Porous Material>

A method of producing a metal porous material according to an embodiment of the present disclosure includes a preparation step and an alloy forming step described below.

The preparation step is a step of preparing a porous material that includes a frame having a three-dimensional network configuration and containing nickel as a primary component, and the preparation step includes:

performing electrically conductive treatment on a surface of a frame of a resin molded article including a frame having a three-dimensional network configuration by applying carbon powder to the surface of the frame of the resin molded article;

performing nickel plating to plate with nickel the surface of the frame of the resin molded article thus made electrically conductive;

subsequently removing the resin molded article by heat treatment in an oxidizing atmosphere; and after the removing the resin molded article, performing heat treatment in a reducing atmosphere containing water vapor to lower an amount of carbon remaining in the nickel.

The alloy forming step is a step of forming alloy of at least nickel and chromium to obtain a metal porous material, the forming involving burying the porous material in powder including chromium (Cr), aluminum oxide ($Al_2O_3$), and ammonium chloride ($NH_4Cl$) and then performing heat treatment to cause diffusion coating of the frame with the chromium.

In the following, a detailed description will be given of these steps.

(Preparation Step)

The preparation step is a step of preparing a porous material that includes a frame having a three-dimensional network configuration and containing nickel as a primary component. The porous material has a sheet-form outer shape. Because the metal porous material according to an embodiment of the present disclosure is obtained by forming alloy of nickel contained in the above-mentioned porous material with chromium, a porous material prepared as the porous material may have a configuration (such as porosity and average pore size) the same as the configuration required of the metal porous material. As the porous material, a porous material that includes a frame typically having a hollow interior portion and defining a pore portion, like the metal porous material, may be prepared. The definitions of the porosity and the average pore size of the porous material are the same as those of the porosity and the average pore size of the metal porous material.

The expression "(the frame) containing nickel as a primary component" means that the frame of the porous material is made of metal in which nickel is contained in the highest amount.

The porous material that includes a frame having a three-dimensional network configuration and contains nickel as a primary component may be, for instance, obtained in the below manner.

—Electrically Conductive Treatment Step—

Figure 4:
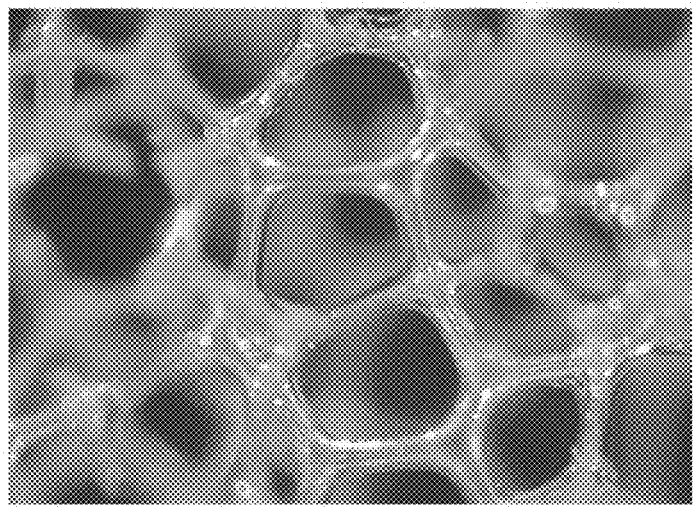
FIG. 4 is a photograph of a urethane foam resin, which is an example resin molded article including a frame having a three-dimensional network configuration.

First, a resin molded article in sheet form including a frame having a three-dimensional network configuration (which may be simply called "resin molded article" hereinafter) is prepared. As the resin molded article, a polyurethane resin, a melamine resin, and/or the like may be used. FIG. 4 is a photograph of a urethane foam resin including a frame having a three-dimensional network configuration.

Next, electrically conductive treatment is performed on a surface of the frame of the resin molded article by applying carbon powder to the surface of the frame of the resin molded article. Examples of the carbon powder used in the electrically conductive treatment include powder of amorphous carbon such as carbon black and powder of carbon such as graphite.

—Plating Step—

In the plating step, nickel electroplating is performed using, as a substrate, the resin molded article the surface of the frame of which has been made electrically conductive. Instead of electroplating, nickel sputtering and/or electroless nickel plating may be employed to form a nickel film. However, from the productivity and cost viewpoints, electroplating is preferable.

Nickel electroplating may be performed by a known technique. A known or commercially available plating bath may be used, such as a Watts bath, a chloride bath, or a sulfamate bath. Nickel electroplating may be performed by immersing the resin molded article resulting from the electrically conductive treatment into a plating bath, connecting the resulting resin molded article to a cathode and connecting a nickel counter electrode plate to an anode, and passing a direct current or a pulse intermittent current.

—Resin Molded Article Removal Step—

After the plating step, the resin molded article that has a nickel plating film on the surface of its frame is subjected to heat treatment in an oxidizing atmosphere and thereby the resin molded article used as a substrate is removed. For instance, the removal of the resin molded article may be performed in an oxidizing atmosphere, such as in atmospheric air, by heating to a temperature not less than about 600° C. and not more than about 800° C., preferably not less than about 600° C. and not more than about 700° C. By this procedure, the resin molded article used as a substrate is burned off and a porous material containing nickel as a primary component is obtained.

—Carbon Removal Step—

Although the resin molded article removal step is capable of removing the resin molded article used as a substrate, the powder of amorphous carbon and/or the powder of carbon used in the electrically conductive treatment may remain inside (in the hollow portion of) the frame of the porous material containing nickel as a primary component (a nickel plating film). Such carbon powder may become the source of chromium carbide in an alloy forming step described below involving forming alloy of nickel and chromium. When it is desired to lower the amount of chromium carbide contained in the frame of the metal porous material according to an embodiment of the present disclosure, it is preferable to lower the amount of the carbon powder by partially removing the carbon powder. When the amount of carbon remaining in the frame of the porous material containing nickel as a primary component is equal to or higher than 0.7 mass %, $Cr_7C_3$ occurs in the alloy forming step (chromizing treatment) described below. Moreover, the excess supply of chromium allows $Cr_{23}C_6$ to occur.

The carbon removal step may be carried out by subjecting the porous material containing nickel as a primary component to heat treatment in a reducing atmosphere containing water vapor ($H_2O$). The heat treatment may be performed at a temperature equal to or higher than 750° C. The heat treatment temperature is preferably high, but it may be equal to or lower than 1000° C. in terms of costs and the material of the body of the reduction furnace.

As a reducing gas, hydrogen gas, or a mixed gas of hydrogen and carbon dioxide or an inert gas, or, as needed, a combination of these may be used. It is particularly preferable that the reducing gas include hydrogen gas from the viewpoint of oxidation-reduction efficiency. When the reducing gas includes water vapor ($H_2O$), carbon remaining in the interior portion of the frame of the porous material containing nickel as a primary component may be removed. The amount of water vapor ($H_2O$) in the reducing gas may be not less than about 0.01 L/m² and not more than about 0.10 L/m², more preferably not less than 0.02 L/m² and not more than 0.05 L/m², relative to the apparent area of the porous material.

This carbon removal step is carried out in a reducing atmosphere and is, therefore, capable of reducing the nickel that was oxidized in the resin molded article removal step and thereby forming a dense metal film.

(Alloy Forming Step)

The alloy forming step is a step of forming alloy of nickel and chromium by diffusion coating, with chromium, of the frame of the porous material containing nickel as a primary component. The method of producing a metal porous material according to an embodiment of the present disclosure uses the porous material mentioned above in which the amount of carbon in the frame is lowered, and, therefore, this method is capable of producing a metal porous material having a low chromium carbide content, a high $Cr_2Ni_3$ content, and a high $Cr_2O_3$ content.

The technique to perform diffusion coating with chromium may be a known technique. An example technique involves burying the porous material containing nickel as a primary component in powder including at least chromium, aluminum oxide, and ammonium chloride and, then, performing heating to a temperature not less than about 800° C. and not more than about 1100° C. in an atmosphere of an inert gas such as Ar gas or in an atmosphere of a gas that has the same composition as the gas occurring in the heat treatment.

When the chromium diffusion coating is performed using an iron furnace or a stainless steel furnace, a solid solution of the frame of the porous material with iron and/or manganese may be formed.

EXAMPLES

In the following, a more detailed description of the present disclosure will be given in the form of examples.

These examples are given by way of illustration, and the metal porous material and the like according to the present disclosure are not limited to those in these examples. The scope of the present invention is defined by claims, and encompasses all modifications and variations equivalent in meaning and scope to the claims.

Example 1

<Preparation Step>

A porous material that includes a frame having a three-dimensional network configuration was prepared in the manner described below.

—Electrically Conductive Treatment Step—

As a resin molded article including a frame having a three-dimensional network configuration, a polyurethane sheet with a width of 1 m and a thickness of 1.0 mm was used. The resin molded article had a porosity of 96% and an average pore size of 450 μm.

Carbon black (100 g) which was amorphous carbon with a particle size not less than 0.01 μm and not more than 0.20 μm was dispersed in 0.5 L of a 10% aqueous solution of acrylic acid ester resin, and thus an adhesive coating material of this ratio was prepared.

Then, the resin molded article was continuously immersed in the resulting coating material, squeezed between rolls, and dried to form a conductive layer on a surface of the frame of the resin molded article. In this way, electrically conductive treatment of the resin molded article was performed.

—Plating Step—

To the resulting electrically conductive surface of the frame of the resin molded article, nickel was made to adhere in an amount of 500 g/m² by electroplating. Thus, a resin structure that included a frame having a surface with a nickel plating film was prepared.

—Resin Molded Article Removal Step—

Then, in order to remove the resin molded article from the resulting resin structure, the resin structure was heated in atmospheric air (in an oxidizing atmosphere) to 700° C. Thus, a porous material containing nickel as a primary component from which the resin molded article was removed was obtained.

—Carbon Removal Step—

Then, in order to remove powder of carbon remaining in the resulting porous material, the porous material was heated to 1000° C. in a reducing atmosphere consisting of a gas that was made by adding water vapor ($H_2O$) to a mixed gas of $H_2$ and $N_2$ (cracked ammonia gas).

Thus, a porous material including a frame in which the amount of remaining carbon was lowered was obtained. Moreover, the nickel was reduced and annealed.

<Alloy Forming Step>

In a stainless steel furnace, a mixed powder composed of Al powder by 1 mass %, Cr powder by 50 mass %, and $NH_4Cl$ by 0.5 mass % with the remainder being made up of $Al_2O_3$ powder was prepared and the porous material was buried in the resulting mixed powder. Subsequently, heat treatment was performed at 1000° C. for 10 hours to obtain a metal porous material No. 1.

Comparative Example 1

A metal porous material No. A was obtained in the same manner as in Example 1 except that the carbon removal step was not carried out.

(Evaluation)

<Measurement of Components of Frame>

The composition of and the alloy components of the frame of each of the metal porous material No. 1 and the metal porous material No. A were examined by EDX analysis and/or XRD analysis. The cross section of the frame of each metal porous material was examined by SEM. In addition, a surface of the frame of each metal porous material was etched with nitric acid, followed by SEM examination of the cross section of the frame. In this way, the presence of a chromium carbide layer was checked.

Results are listed in Table 1.

<Water Repellency>

Each of the metal porous material No. 1 and the metal porous material No. A was left to stand, and on a principal surface thereof, a single droplet of deionized water (about 0.03 to 0.05 ml) was placed with a pipette. The metal porous material was visually examined from a side surface thereof, and the time until no water droplet was seen to remain on an upper surface thereof (until all the water entered into a pore portion) was measured.

Results are listed in Table 1.

TABLE 1

| Metal porous material No. | Surface EDX (%) | | | | XRD | | | Thickness (μm) | | Evaluation Water repellency (seconds) |
|---|---|---|---|---|---|---|---|---|---|---|
| | Ni | Cr | Si | Fe | $Ni_2Cr$ | $Cr_2O_3$ | $Cr_{23}C_6$ | $Cr_2O_3$ | $Cr_7C_3$ $Cr_{23}C_6$ | |
| 1 | Remainder | 22 | 2.0 | 0.5 | Detected | Detected | Detected | 1.5 | 0.3 | >5 |
| A | Remainder | 29 | 0.3 | 2 | Detected | Not detected | Detected | <0.1 | 1 | <1 |

The metal porous material No. 1 had a high $Cr_2O_3$ content and thereby the frame had an excellent water repellency. Because of a low chromium carbide content, bendability was also found to be excellent.

In contrast, the metal porous material No. A had a low $Cr_2O_3$ content compared to the metal porous material No. 1 and the frame had a low water repellency. Because of a high chromium carbide content, the frame had an excellent hardness but had a low bendability.

REFERENCE SIGNS LIST 10 metal porous material, 11 frame, 12 alloy film constituting the frame, 121 chromium oxide layer, 122 chromium carbide layer, 13 interior portion of frame, 14 pore portion.

The invention claimed is:
1. A metal porous material in sheet form comprising a frame having a three-dimensional network configuration, wherein
   the metal porous material has a porosity not less than 60% and not more than 98%, the frame includes an alloy including at least nickel and chromium, the frame is a solid solution with iron, where the iron content is not less than about 200 ppm and not more than about 2000 ppm, the frame includes a chromium oxide layer as an outermost layer and includes a chromium carbide layer located under the chromium oxide layer, the chromium oxide layer has a thickness not less than 0.1 μm and not more than 3 μm, and the chromium carbide layer has a thickness not less than 0.1 μm and not more than 0.5 μm.

2. The metal porous material according to claim 1, wherein the metal porous material has an average pore size not less than 50 μm and not more than 5000 μm.

3. A fuel cell comprising the metal porous material according to claim 1, as a gas diffusion layer.

4. A method of producing the metal porous material of claim 1, the method comprising:

preparing a porous material that includes a frame having a three-dimensional network configuration and containing nickel as a primary component, and after the preparing, forming alloy of at least nickel and chromium to obtain a metal porous material, the forming involving burying the porous material in powder including chromium, aluminum oxide, and ammonium chloride and then performing heat treatment to cause diffusion coating of the frame with the chromium, wherein the diffusion coating with the chromium is performed such that a solid solution of the frame with iron is formed, where the iron content is not less than about 200 ppm and not more than about 2000 ppm, and the preparing includes:

performing electrically conductive treatment on a surface of a frame of a resin molded article including a frame having a three-dimensional network configuration by applying carbon powder to the surface of the frame of the resin molded article;

performing nickel plating to plate with nickel the surface of the frame of the resin molded article thus made electrically conductive;

subsequently removing the resin molded article by heat treatment in an oxidizing atmosphere; and after the removing the resin molded article, performing heat treatment in a reducing atmosphere containing water vapor to lower an amount of carbon remaining in the nickel.

\* \* \* \* \*